United States Patent

Kato et al.

[11] Patent Number: 5,325,446
[45] Date of Patent: Jun. 28, 1994

[54] APPARATUS FOR IMAGE TRANSFORMATION

[75] Inventors: Tetsuro Kato, Kanagawa; Yoshiyuki Nakamura, Tokyo, both of Japan

[73] Assignee: Sony Corporation, Tokyo, Japan

[21] Appl. No.: 525,136

[22] Filed: May 17, 1990

[30] Foreign Application Priority Data

May 19, 1989 [JP] Japan ................................. 1-124167
May 19, 1989 [JP] Japan ................................. 1-124168

[51] Int. Cl.$^5$ ............................................. G06K 9/00
[52] U.S. Cl. ....................................... 382/44; 382/41
[58] Field of Search ............. 382/41, 44, 46, 49, 382/45; 340/728, 729, 747; 364/522, 521, 413.16, 413.19, 413.18, 474.31, 474.36, 731; 358/22, 181, 183, 22; 345/25, 26, 27, 28

[56] References Cited

U.S. PATENT DOCUMENTS 4,829,456  5/1989  Joonshi et al. ..................... 364/522
4,831,445  5/1989  Kawabe ............................ 358/22
4,831,447  5/1989  Lake, Jr. .......................... 382/46
4,860,217  8/1989  Sasaki et al. ..................... 382/46

FOREIGN PATENT DOCUMENTS

0198630A3  10/1986  European Pat. Off. ...... G06F 15/72
0280316A2  8/1988   European Pat. Off. ...... G06F 15/62
2119594A   11/1983  United Kingdom .......... H04N 5/22
2200266A   7/1988   United Kingdom ........ H04N 5/262

Primary Examiner—David K. Moore
Attorney, Agent, or Firm—Philip M. Shaw, Jr.

[57] ABSTRACT

In an apparatus for position transformation of input image data according to a transformation function to thereby generate image data at the position of each pixel of an output image, it is detected whether or not each position is located inside the boundary of the input image and, if so, the input image data for that position is function, but if not, stored background image data is transformed according to the transformation function instead.

1 Claim, 7 Drawing Sheets

APPARATUS FOR IMAGE TRANSFORMATION

BACKGROUND OF THE INVENTION

1. Field of the Invention

The present invention relates to an apparatus for image transformation of an input image to an output image and more particularly to an apparatus for image transformation which reduces aliasing occurring at the edge portion of the output picture when an input image is transformed.

2. Description of the Prior Art

Apparatus for image transformation which, when applied to television broadcasting and production of an animation, subject an input image to such transformations as rotation, magnification, reduction, and movement, or spread an input image over a curved surface in a three-dimensional coordinate system, to thereby generate an output image are well known, as for example, shown in the gazette of Japanese Laid-open Patent Publication No. 61-230477.

In an apparatus for image transformation of a type which, when generating an output image by transforming an input image, produces the image data of each pixel of the output image by performing an interpolating calculation on four sets of picture data of the input image, the output image obtained by such a transformation of an input image becomes jagged exhibiting a stair-step appearance at its edge portion, which is the so-called aliasing effect. There has so far been known an art to reduce such an aliasing by applying a two-dimensional digital filter to an output image so that the data at the edge portion of the output image are averaged. However, if image data are averaged by means of such a two-dimensional digital filter, the edge portion of the output image becomes a blurred line and the resolution there becomes deteriorated.

SUMMARY OF THE INVENTION

Object

An object of the present invention is to provide an apparatus for image transformation which reduces the aliasing occurring at the edge portion of an output image without deteriorating resolution of the output image at the edge portion.

SUMMARY OF THE INVENTION

In order to achieve the above mentioned object of the invention, the present invention resides in apparatus for image transformation of the type having an input image memory for storing image data representative of an image at the position of each pixel of an input image, address generation means for generating a read address according to a desired transformation function, and calculation means for performing an interpolating calculation on a plurality of sets of image data read out from the input image memory according to the read address output from the address generation means thereby generating image data at the position of each pixel of an output image. The improvement comprises means for detecting whether or not a position designated by an address generated by the address generation means is located inside the input image stored in the input image memory, and, if so, reading image data out from the input image memory to the calculation means and, if not, supplying background image data to the calculation means.

DETAILED DESCRIPTION OF THE PREFERRED EMBODIMENT

Before describing a particular structure of the present invention, a description will be given of the principle of the image transformation in the apparatus for image transformation of the present invention.

Considering the transformation of a pixel of an input image, whose coordinates are (x,y), on an x-y plane to cause the pixel to rotate about the point (0,0) through an angle $\alpha$, the coordinate transformation function for obtaining the coordinates (x', y') of the output image after the transformation is expressed as $$\begin{pmatrix} x' \\ y' \end{pmatrix} = \begin{pmatrix} \cos \alpha & \sin \alpha \\ -\sin \alpha & \cos \alpha \end{pmatrix} \begin{pmatrix} x \\ y \end{pmatrix}$$

Figure 1:
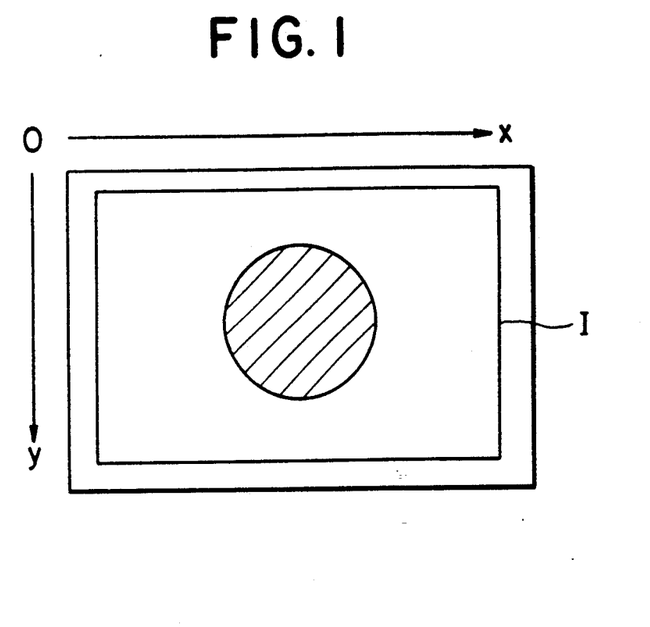
FIG. 1 is a schematic diagram showing an example of an input image.
Figure 2:
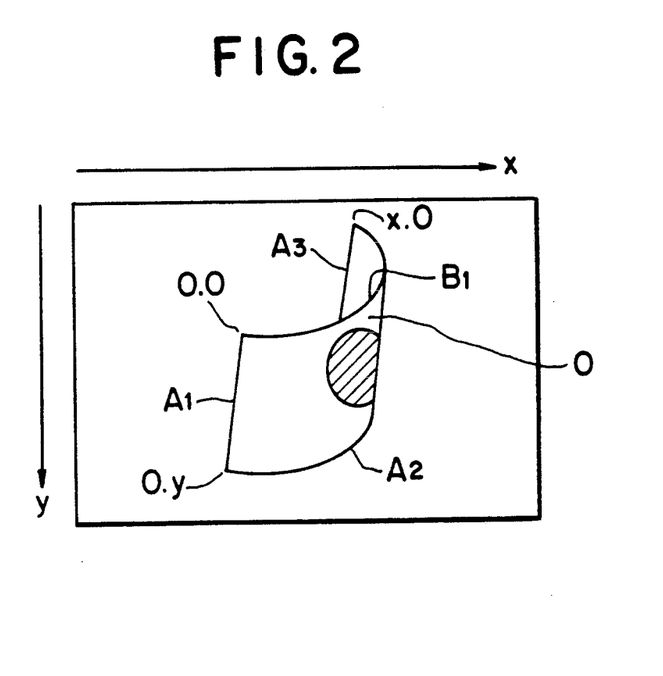
FIG. 2 is a schematic diagram showing an example of an output image.

Now, if a desired function is established as a coordinate transformation function, it is possible to achieve an image transformation whereby an input image I, whose coordinates are x, y as shown in FIG. 1, is first spread over a curved surface and then reduced in size. The form after the transformation becomes, for example, as shown in FIG. 2.

Figure 3:
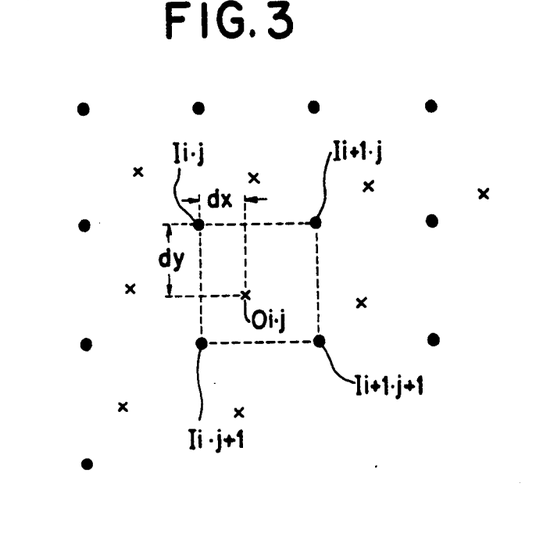
FIG. 3 and FIG. 4 are schematic diagrams for explaining the principle on which the output image data is generated by interpolation.

In such case, as shown in FIG. 3, the position of each pixel (indicated by x) of the output image O in the input image I and the pixel of the input image (indicated by ·) are, in general, not in agreement with each other. Therefore, the image data $O_{i,j}$ of each pixel of the output image O is obtained by an interpolating calculation performed on image data of the input image I.

More specifically, the image data $O_{i,j}$ of a pixel $O_{i,j}$ of the output image O is obtained by an interpolating calculation performed on four sets of image data $I_{i,j}$, $I_{i+1,j}$, $I_{i,j+1}$, and $I_{i+1,j+1}$ of the input image surrounding the pixel $O_{i,j}$ as shown in FIG. 3. In the interpolation, the image data of the output image O is obtained from the following equation $$O_{i,j} = I_{i,j} \cdot (1 - dx)(1 - dy) + I_{i+1,j} \cdot dx(1 - dy) + I_{i,j+1} \cdot (1 - dx)dy + I_{i+1,j+1} \cdot dx \cdot dy \quad (1)$$

where dx and dy are distances between the position of a pixel of the output image and four sets of image data of the input image surrounding the pixel of the output image.

In an output image obtained as a result of the image transformation according to the above described image transformation system as shown in FIG. 2, for example, the pixels of the output image located along the boundary (edge) lines $A_1$, $A_2$, $A_3$ between the transformed output image and the background are not always obtainable by the interpolating calculation of four sets of pixel data of the input image I surrounding each of the pixels of the output image.

Figure 4:
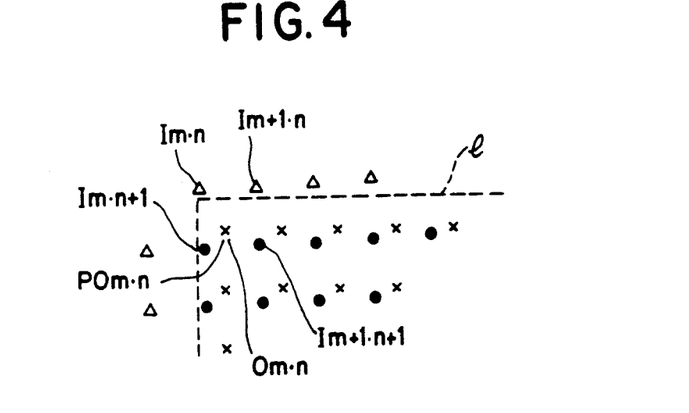
Figure 5:
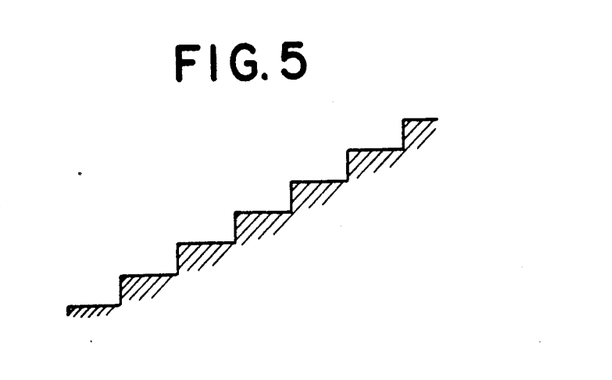
FIG. 5 is a schematic diagram showing a state where aliasing is produced at the edge portion of an output image.

Now, we indicate the boundary of an input image on an output image by a dotted line 1 as shown in FIG. 4. The pixel data $O_{m \cdot n}$ of the pixel $PO_{m \cdot n}$ located in the vicinity of the boundary may be obtained by an interpolating calculation performed on the pixel data $I_{m \cdot n}$, $I_{m+1 \cdot n}$ (indicated by Δ) of pixels located outside the input image and the pixel data $I_{m \cdot n+1}$, $I_{m+1 \cdot n+1}$ of pixels located inside the input image. However, since, conventionally, there are present no data of the pixels (indicated by Δ) located outside the input image, a smooth interpolating calculation cannot be performed for the portion along the boundary exhibits a stair-step appearance, that is, the so-called aliasing occurs there, and the image is thereby deteriorated as shown in FIG. 5.

According to the present invention, the above described problem can be solved. Below will be given a detailed description of the structure of the apparatus for image transformation of the present invention.

Figure 6:
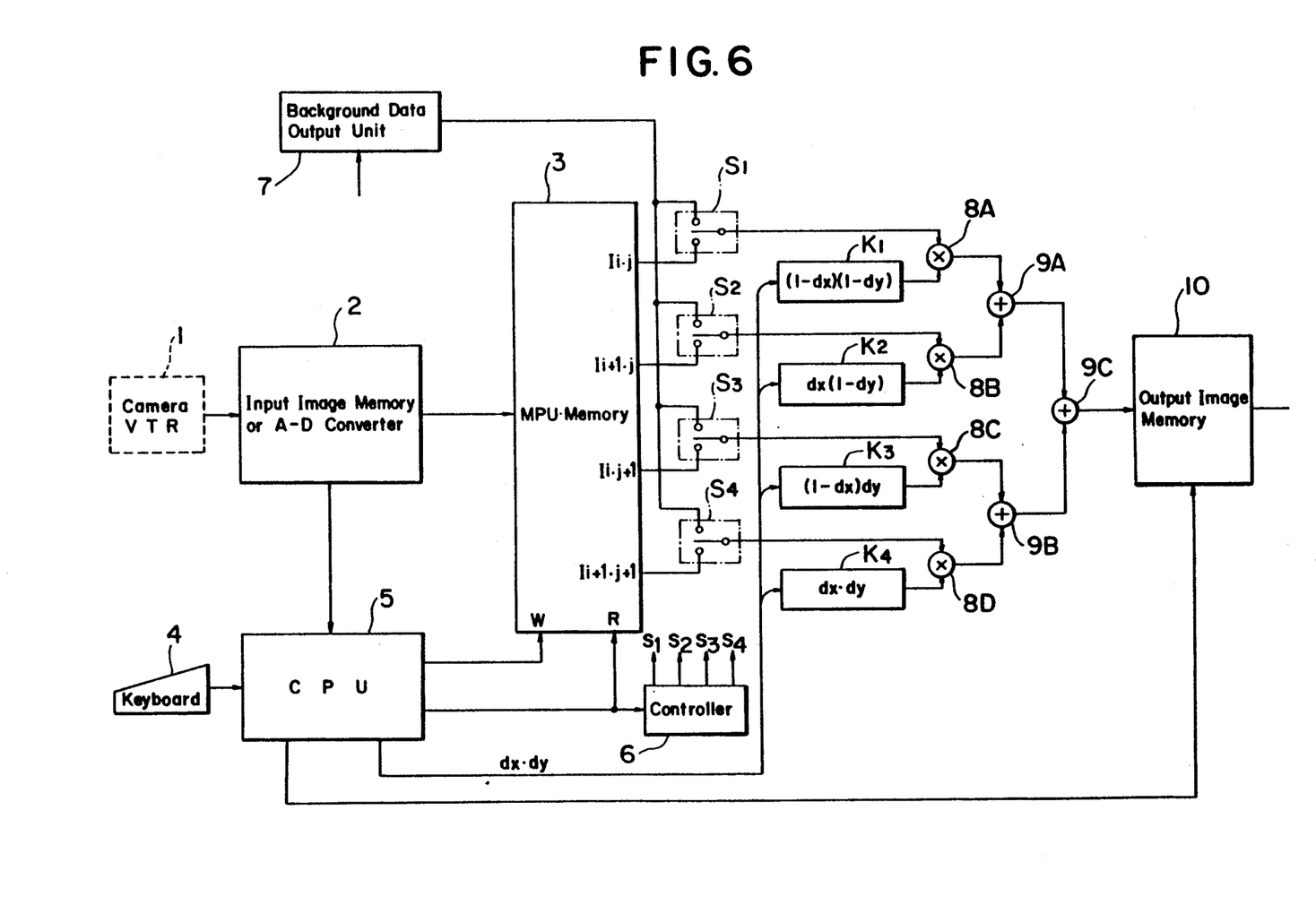
FIG. 6 is a block diagram showing an embodiment of the apparatus for image transformation of the present invention.

FIG. 6 is a block diagram showing an embodiment of the apparatus for image transformation according to the present invention. Referring to the diagram, reference numeral 1 denotes a unit (VTR, camera) delivering a video signal to be subjected to an image transformation and 2 denotes a digital image input unit constituted of an input image or an A/D converter. Reference numeral 3 denotes a mapping memory for accepting image data from the digital image input unit 2 at predetermined timing and outputting the image data according to an read address signal. Writing data into and reading data out of the mapping memory 3 is controlled by a control unit (CPU) 5 to which an image transformation function is input from a keyboard 4.

The CPU 5 sequentially reads out image data $I_{i,j}$, $I_{i+1,j}$, $I_{i,j+1}$, and $I_{i+1,j+1}$ of four pixels surrounding each pixel of an output image from the mapping memory 3 according to a given transformation function, and supplies the data to input terminals on one side of changeover switches $S_1$, $S_2$, $S_3$, and $S_4$, respectively.

The input terminals on the other side of the changeover switches $S_1$, $S_2$, $S_3$, and $S_4$ are supplied with image data becoming the background of the output image from a background data output unit 7 and the switches $S_1$, $S_2$, $S_3$, and $S_4$ are controlled for switching by the corresponding outputs of a controller 6 which, in turn, is controlled by the CPU 5.

The controller 6 decides whether or not the position designated by a read address is inside the input image, and when it decides that the position designated by the read address is located outside the input image, it allows the data from the background data output unit 7 to be output to the corresponding switch $S_n$ selected thereby out of the switches $S_1$, $S_2$, $S_3$, and $S_4$.

Reference numerals $K_1$, $K_2$, $K_3$, and $K_4$ denote coefficient units for calculating image data of each pixel of the output image. The coefficient units $K_1$, $K_2$, $K_3$, and $K_4$ accept, in order to perform the interpolating calculation according to equation (1), from the CPU 5, distances dx and dy between the four pixels of the input image corresponding to each pixel of the output image and the pixel of the output image and supply these values to multipliers 8A, 8B, 8C and 8D.

The products obtained by the multipliers 8A, 8B, 8C, and 8D are added together by adders 9A, 9B, and 9C, and thereby, the output image data corresponding to each pixel of the output image is generated.

Reference numeral 10 denotes an output image memory storing image data corresponding to each of the pixels of the output image, thereby generating one field.

The apparatus for image transformation of the present invention, while performing the interpolating calculation of image data, changes over the corresponding switch $S_n$ of the switches $S_1$, $S_2$, $S_3$, and $S_4$ when an address outside the input image is specified for the mapping memory 3, so that a preset image data corresponding to the background is selected and the thus selected data is used in the interpolating calculation as described above. Hence, the output image data of each pixel at the boundary line of the output image is obtained by an interpolating calculation of the input image data mixed with the background data.

Therefore, it becomes possible to smooth the edge portion of the output image and reduce the aliasing.

When addresses specified for the mapping memory 3 of the four points are all located inside the input image, the switches $S_1$, $S_2$, $S_3$, and $S_4$ are controlled to select only the outputs of the mapping memory 3 so that the output image data, as a matter of course, is generated by interpolating calculation of only four input image data read out from the mapping memory 3.

Figure 7:
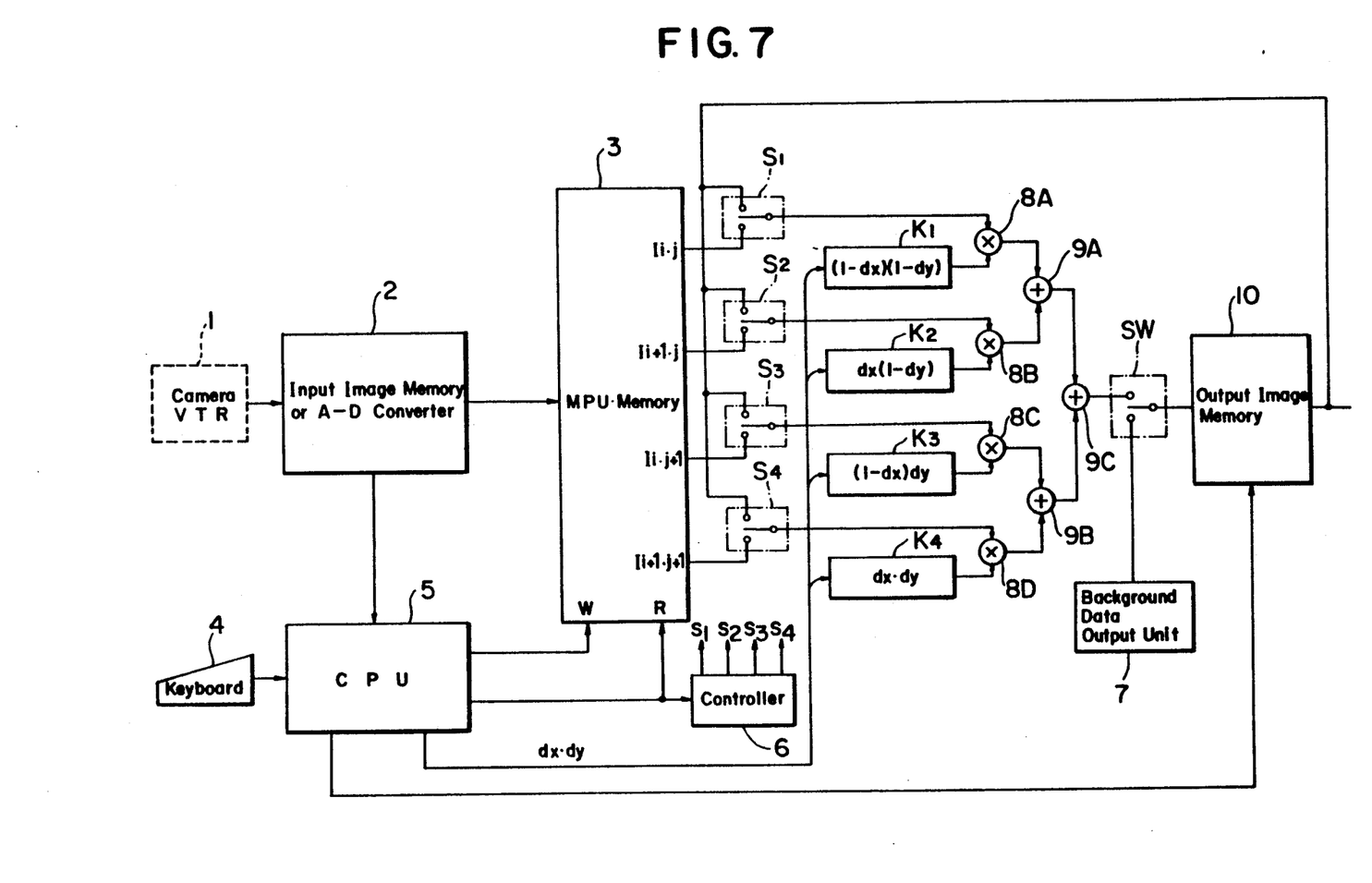
FIG. 7 is a block diagram showing another embodiment of the apparatus for image transformation of the present invention.

Now, another embodiment of the apparatus for image transformation according to the present invention will be described with reference to FIG. 7. This embodiment suppresses the occurrence of a stair-step appearance at the edge portion (aliasing) of the output image when an image written in the input image memory is converted (transformed) and written into the output image memory 10 having image data already written therein. Denoting parts like those in FIG. 6 by corresponding reference numerals, explanation thereof will be omitted. In this embodiment, when the address specified for the mapping memory 3 is located outside the input image, it allows the data stored in the output image memory 10 to be read out therefrom and used for the interpolating calculation. By so doing, the aliasing occurring at the edge of the output image can be reduced.

More particularly, the image data $I_{i,j}$, $I_{i+1,j}$, $I_{i,j+1}$, and $I_{i+1,j+1}$ of four pixels surrounding each pixel of the output image are sequentially read out from the input image memory 2 and are respectively supplied to one input terminal of each of the changeover switches $S_1$, $S_2$, $S_3$, and $S_4$.

The other input terminals of each of the changeover switches $S_1$, $S_2$, $S_3$, and $S_4$ are respectively supplied with data read out from the output image memory 10. The output image memory 10 stores, as initial values, background data supplied in advance from the background data output unit 7.

The switches $S_1$, $S_2$, $S_3$, and $S_4$ are selectively operated by the controller 6 under the control of the CPU 5.

The controller 6 decides whether the address specified for the mapping memory 3 is inside the input image or outside it, and when it is located outside the input image, it allows the data read out from the output image memory 10 to be supplied to one of the multipliers 8A-8D through the corresponding switch $S_n$ selected thereby out of the switches $S_1$, $S_2$, $S_3$, and $S_4$.

The output image memory 10 is constituted of a dual type field memory which stores image data corresponding to each pixel of the output image and allowing the data to be read according to address data output from the control unit 5.

In the normal state, image data of four pixels surrounding each pixel of the output image are read out and used as the data for the interpolating calculation.

However, in the interpolating calculation of the output image data, when an address outside the input image is specified for the mapping memory 3, the corresponding switch $S_n$ out of the switches $S_1$, $S_2$, $S_3$, and $S_4$ is changed over, whereby data corresponding to the address (the image data corresponding to the background) is read out from the output image memory 10 and used for the interpolating calculation. Hence, the image data of each pixel to constitute the boundary line is provided by the image data read out from the output image memory 10 mixed with the data read out from the mapping memory 3.

Therefore, it becomes possible to obtain image data of the pixels at the boundary line through satisfactory interpolation thereby smoothing the boundary line. Thus, the aliasing can be reduced.

Figure 8:
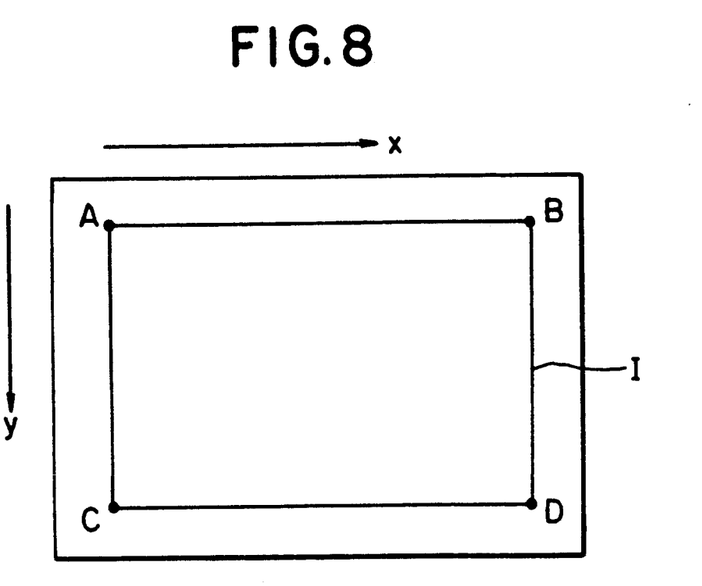
FIG. 8 is a schematic diagram showing an example of an input image.
Figure 9:
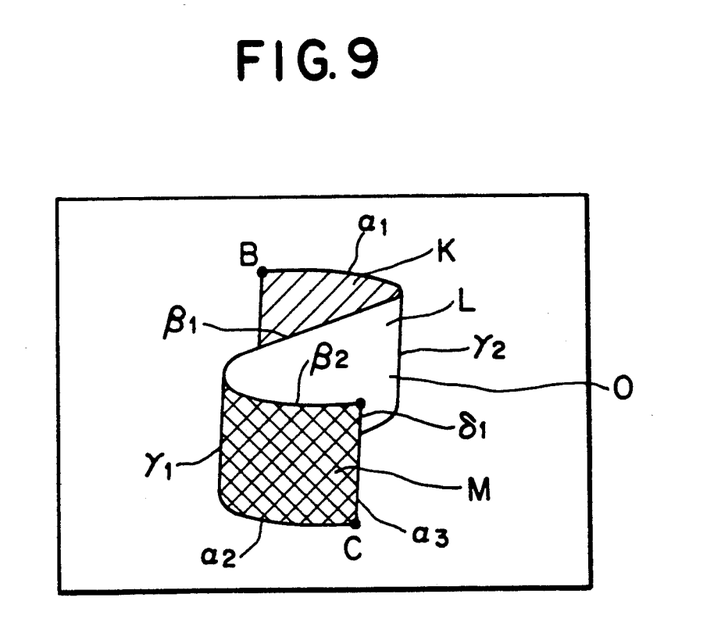
FIG. 9 is a schematic diagram showing an example of an output image.

When a coordinate transformation function includes a coordinate transformation about the z-axis, then an input image I, as shown in FIG. 8, can be transformed into an output image O spread over a three-dimensional curved surface as show in FIG. 9.

More specifically, in the first process, image data stored in the mapping memory 3 is transformed according to the coordinate transformation function, whereby the output image on the face indicated by character K in FIG. 9 is stored in the output image memory 10. In the next process, the image stored in the mapping memory 3 is transformed and overwritten in the output image memory 10, whereby the output image on the face indicated by character L in FIG. 9 is formed in the output image memory 10, and in the next process, the image stored in the mapping memory 3 is transformed and overwritten in the output image memory 10, whereby the output image on the face indicated by character M in FIG. 9 is stored in the output image memory 10. Through such a procedure, an image of the folded form as a whole in the three-dimensional coordinate system can be generated.

In order to reduce the aliasing occurring in the above described transformation, in the present invention the image data of each pixel in the boundary line, generated when the front surface of a transformed output image overlaps the reverse side of the same, is obtained by an interpolating calculation performed on the image data of the rear side stored in the output image memory 10 and image data read out from the mapping memory 3. The image data of each pixel in the boundary line between the front surface of the transformed output image and the background is obtained by an interpolating calculation performed on the background data supplied from the background data output unit 7 and image data read out from the mapping memory 3.

Figure 10:
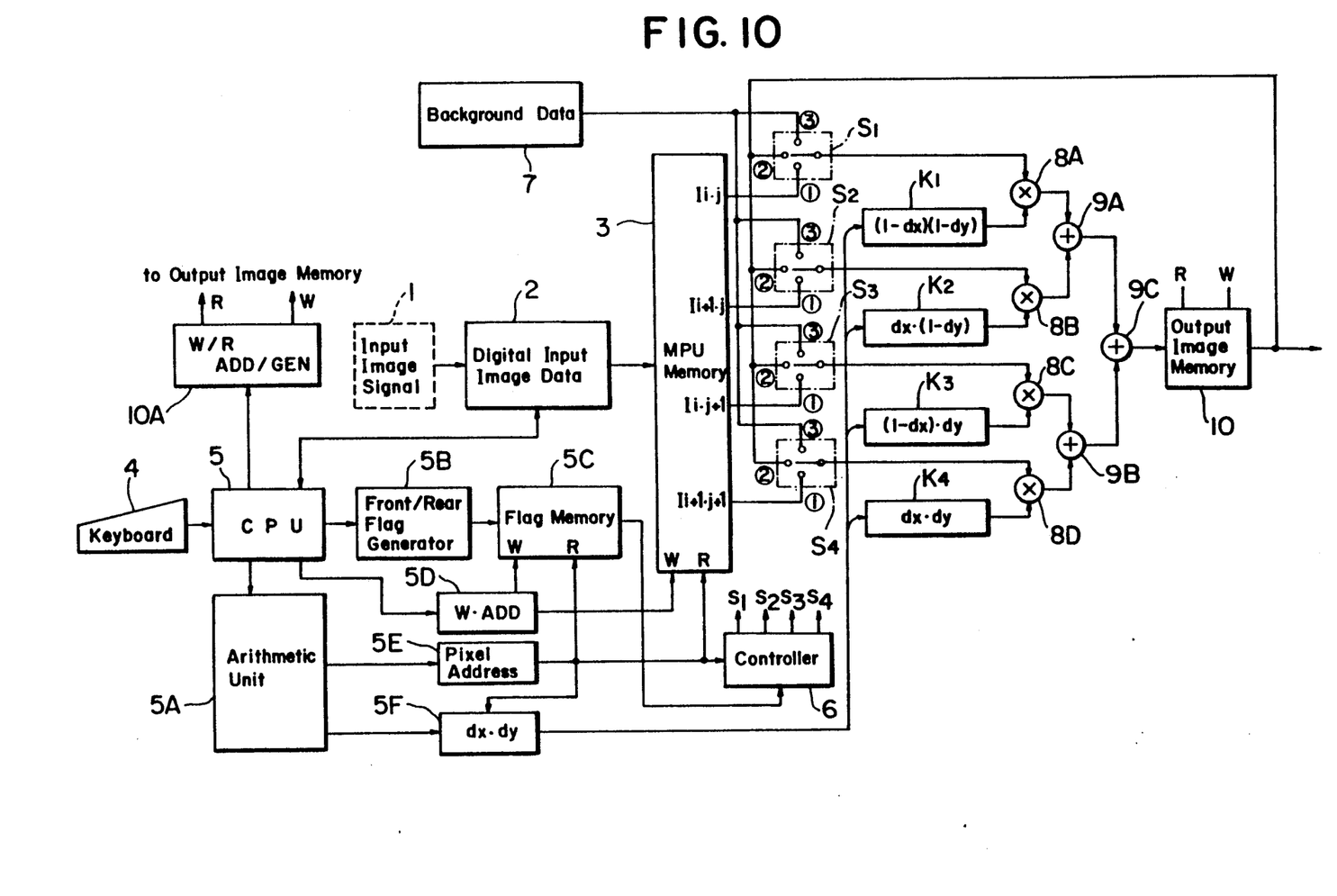
FIG. 10 is a block diagram showing a further embodiment of the apparatus for image transformation of the present invention.

Such an embodiment will be described with reference to FIG. 10. Reference numeral 1 denotes a unit (VTR, TV camera) for supplying a video signal to be subjected to an image transformation, 2 denotes a digital image input unit constituted of an input image memory or an A/D converter, and 3 denotes a mapping memory accepting image data from the digital image input unit 2 at predetermined timing and generating input image data according to a read address supplied from a pixel address generator 5E. Writing data into and reading data out of the mapping memory 3 are controlled by the control unit (CPU) 5 to which the image transformation function is input from the keyboard 4.

The CPU 5 specifies the address of the position of the pixel of image data subjected to the image transformation according to transformation parameters. The CPU 5 includes an arithmetic unit 5A, which determines to what point of the pixel of the input image the position of the transformed pixel corresponds and calculates data dx, dy, 1−dx, 1−dy representing the distances between the positions of four pixels of the input image surrounding the pixel of the output image and the position of the pixel of the output image. The CPU 5 further includes a front/rear flag generator 5B for generating a set of data indicating the front surface and that indicating the rear side (signs indicating the depths) of an output image produced when an input image is transformed into a form as if it is spread over a three-dimensional curved surface according to an image transformation function and a flag memory 5C for storing the flag data (0,1).

In the flag memory 5C the sign (flag) indicative of the depth of a transformed image is written according to the address supplied from an address generator 5D supplying an address signal to the mapping memory 3. The flag is read out according to the address output from a pixel address generator 5E, which generates a read for the mapping memory 3, together with mapping data $I_{(i,j\cdot 1+i\cdot 1+j)}$.

Reference numeral 5F denotes a distance data output unit for loading data representative of distances between four pixels of the input image surrounding each pixel of the output image and the pixel of the output image into later described coefficient units $K_1$ to $K_4$, respectively.

As described above, the image data $I_{i,j}$, $I_{i+1,j}$, $I_{i,j+1}$, and $I_{i+1,j+1}$ of four pixels surrounding each pixel of the output image are sequentially read out from the mapping memory 3 and supplied to first input terminals (1) of the changeover switches $S_1$, $S_2$, $S_3$, and $S_4$.

Second input terminals (2) of the changeover switches $S_1$, $S_2$, $S_3$, and $S_4$ are supplied with output image data from the output image memory 10. Further, third input terminals (3) are supplied with the background data from the background data output unit 7.

The switches $S_1$, $S_2$, $S_3$, and $S_4$ are changed over by the controller 6.

The controller 6 determines, according to the flag supplied from the flag memory 5C, whether the read address from the pixel address generator 5E is inside the input image to be transformed presently, inside the background, or inside the output image already transformed. The controller 6, when the read address generated by the pixel address generator 5E is inside the input image to be transformed presently, changes over the corresponding switch $S_n$ (n=1, 2, 3 or 4) to the first input terminal, when it is inside the background, changes over the corresponding switch $S_n$ to the third input, and when it is inside the output image already transformed, changes over the corresponding switch $S_n$ to the second input.

The coefficient units $K_1$ to $K_4$, in order to perform the interpolating calculation according to the above described equation (1), supply the four data dx, dy, 1−dx, 1−dy corresponding to the pixel of the output image supplied from the distance data output unit 5F to the multipliers 8A, 8B, 8C, and 8D.

The products obtained by the multipliers 8A, 8B, 8C, and 8D are added by the adders 9A, 9B, and 9C, whereby the output image data $O_{ij}$ corresponding to each pixel of the output image is generated and the data is stored in the output image memory 10.

Now, the changeover of the switches $S_1$, $S_2$, $S_3$, and $S_4$ by the controller 6 will be described.

When a boundary line is formed by the front surface of the currently transformed output image overlapping the rear side of the already transformed output image, there are mixedly present the flag "0" indicating the front and the flag "1" indicating the rear.

For the address with the flag "0" attached thereto, the image data currently read out from the input image memory is accepted through the switch $S_n$, while for the address with the flag "1" attached thereto, the image data earlier transformed and stored in the output image memory 10 is accepted through the switch $S_n$. Then, by an interpolating calculation performed on the image data output from the switches $S_1$, $S_2$, $S_3$, and $S_4$, the output image is generated and written into the output image memory 10.

At the time of the interpolating calculation, if there is any address at which any image data is not stored in the mapping memory 3, that is, an address provided with neither flag "0" nor flag "1", then background data from the background data output unit 7 is taken in through a switch $S_n$. Thereupon, an output image is generated through an interpolating calculation performed on the image data output from the switches $S_1$, $S_2$, $S_3$, and $S_4$, and the output image is written into the output image memory 10.

Figure 11:
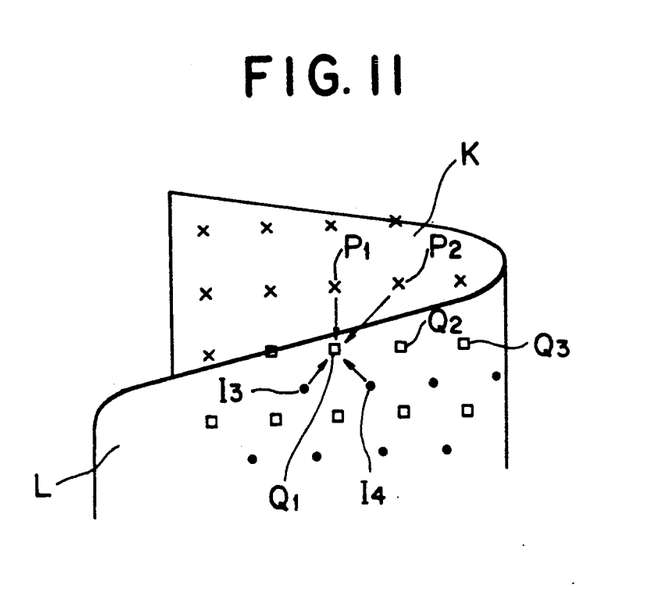
FIG. 11 is a schematic diagram for explaining the principle of the present invention on which image data on a boundary line between the front surface and the rear side of an output image is obtained by interpolation.
Figure 12:
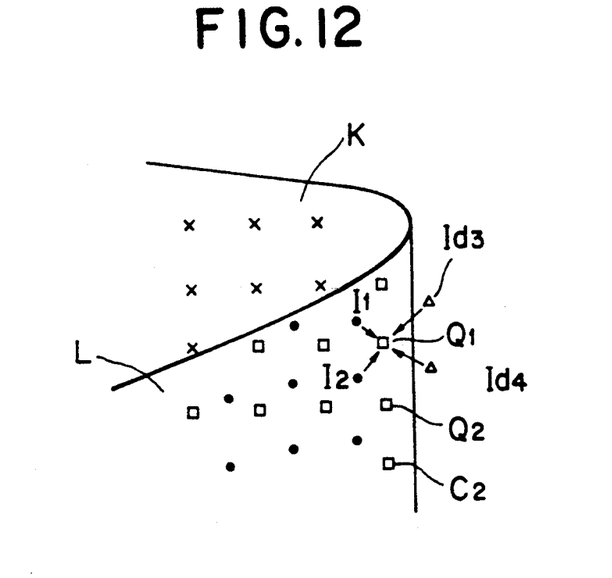
FIG. 12 is a schematic diagram for explaining the principle of the present invention on which image data on a boundary line between the front surface of an output image and the background image is obtained by interpolation.

When the front surface L overlaps the rear side K, pixel data of pixels $Q_1$, $Q_2$, and $Q_3$ at the shallow portion (on the front surface L), indicated by □ in FIGS. 11 and 12, are obtained by using image data of pixels $P_1$, $P_2$ located outside the surface L (pixels on the rear side K) for interpolation. More specifically, data stored in the output image memory 10 as the output image data at the deep portion (on the rear side K) indicated by x and the input image data read out from the mapping memory 3 (indicated by ·) are supplied to the multipliers through the switches $S_1$, $S_2$, $S_3$, and $S_4$ for the interpolating calculation.

Even when there is produced a boundary line between the front surface L and the rear side K, there can be formed a boundary line γ2 between the front surface and the background as shown in FIG. 9.

The image data of each pixel constituting the boundary line between the front surface L and the background, as shown in FIG. 12, is obtained by supplying the background data (indicated by Δ) and the input image data read out from the mapping memory 3 (indicated by ·) to the multipliers 8A, 8B, 8C, and 8D through the switches $S_1$, $S_2$, $S_3$, and $S_4$ for the interpolating calculation.

Thus, when generating an output image by transforming an input image according to a desired transformation function, it is made possible by the apparatus for image transformation of the present invention to have a smooth edge portion of the output image.

We claim:

1. An apparatus for image transformation having an input image memory for storing image data representative of an image at the position of each pixel of an input image, address generation means for generating a read address according to a desired transformation function, and calculation means for performing an interpolating calculation on a plurality of image data read out from said input image memory according to the read address output from said address generation means thereby generating image data at the position of each pixel of an output image, comprising:

a) detection means for detecting whether or not a position designated by an address generated by said address generation means is located inside the input image stored in said input image memory;

b) background image data generation means for generating data representative of a background image; and c) switch means responsive to the output signal from said detection means for selectively supplying image data read out from said input image memory and the data representative of the background image output from said background image data generation means to said calculation means, wherein said switch means, when the position designated by an address generated by said address generation means is located inside the input image stored in said input image memory, supplies image data read out from said input image memory to said calculation means, and when the same is located outside the input image stored in said input image memory, supplies image data read out from said background image data generation means to said calculation means.

* * * * *